Sept. 27, 1955 C. H. THOMPSON 2,718,952
COMBINATION CENTRIFUGAL CLUTCH AND PULLEY STRUCTURE
Filed Dec. 31, 1952 2 Sheets-Sheet 1
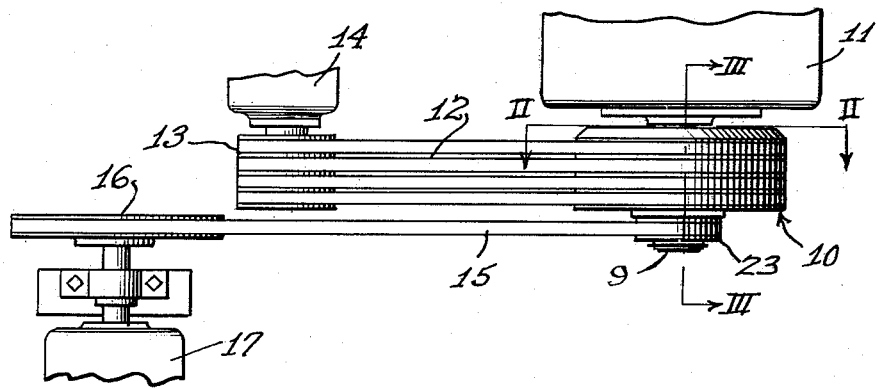
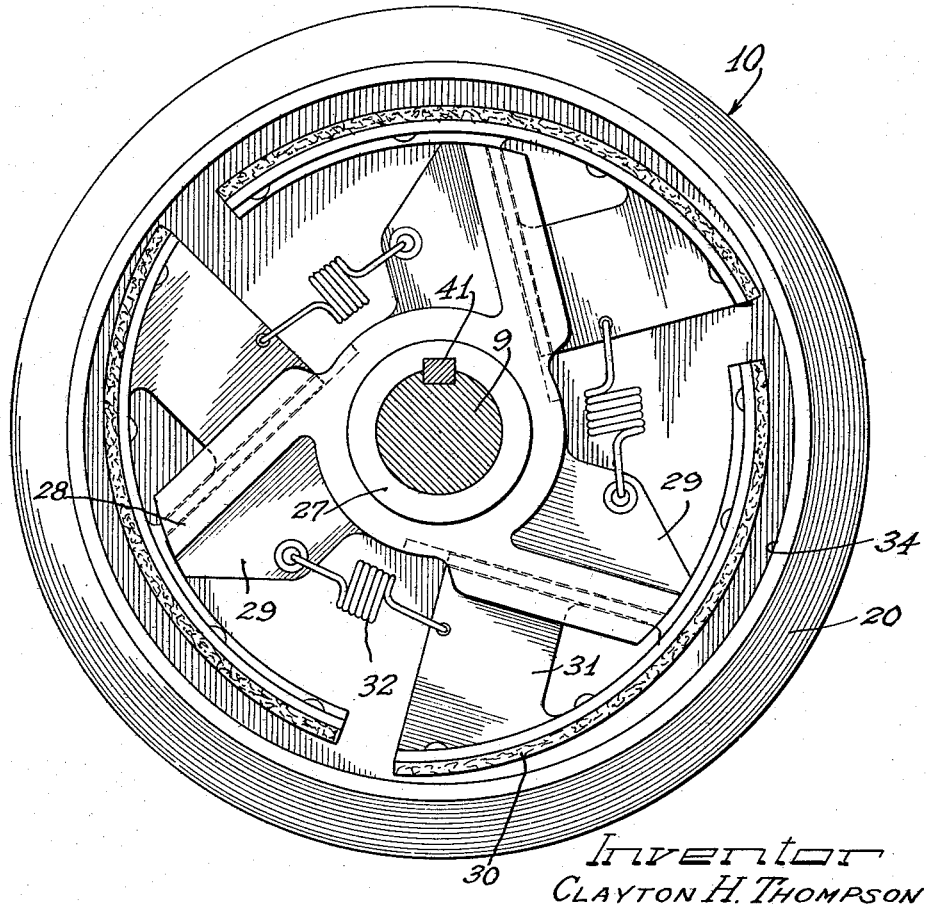
Inventor
CLAYTON H. THOMPSON
by Hill, Sherman, Meroni, Gross & Simpson
Attys.

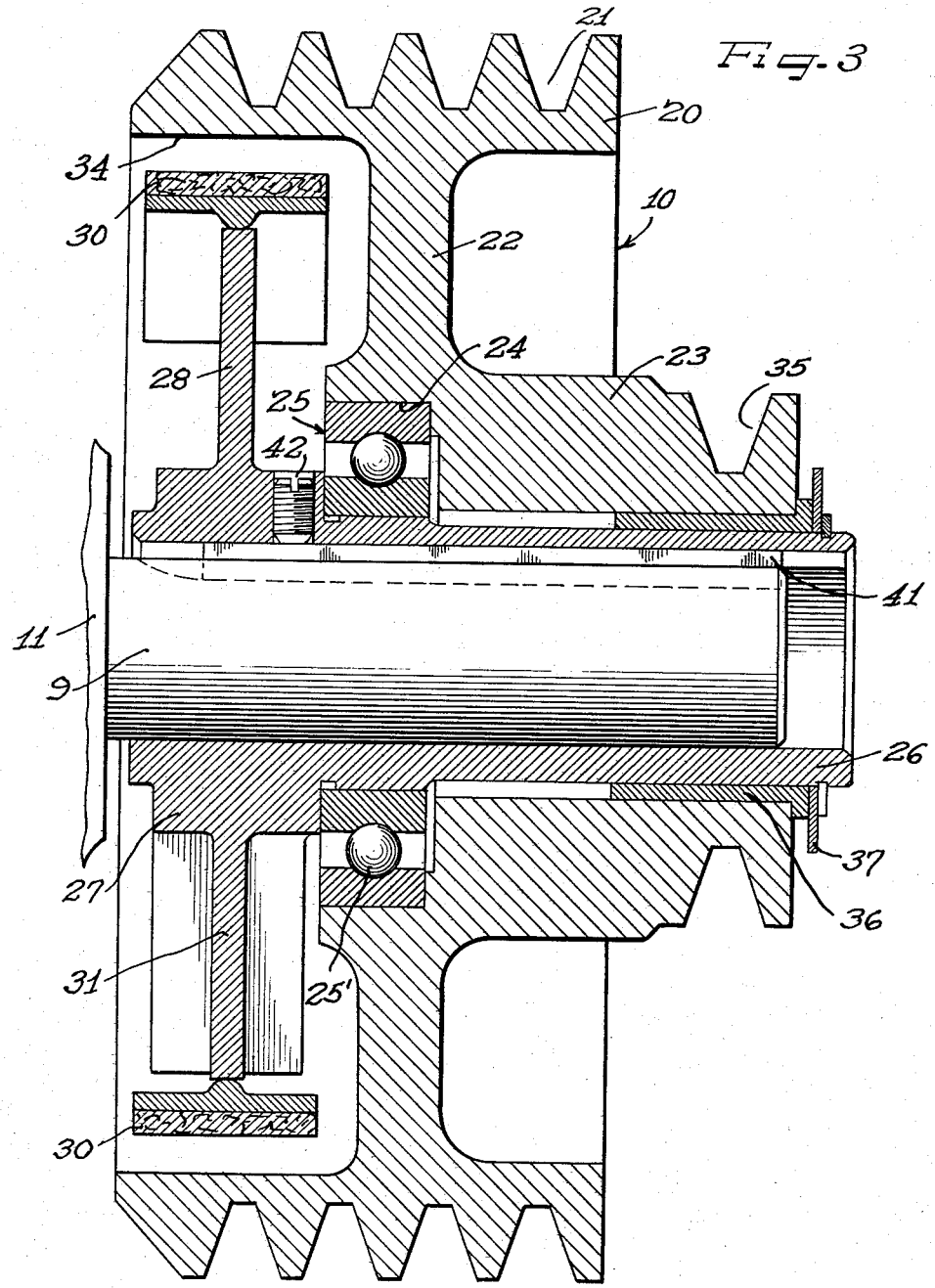

2,718,952

Patented Sept. 27, 1955

2,718,952
COMBINATION CENTRIFUGAL CLUTCH AND PULLEY STRUCTURE

Clayton H. Thompson, Elgin, Ill., assignor to Elgin Sweeper Company, Elgin, Ill., a corporation of Illinois Application December 31, 1952, Serial No. 328,846

6 Claims. (Cl. 192—105)

This invention relates to a combination centrifugal clutch and pulley structure and more specifically to an improvement in the structure shown in United States Letters Patent No. 2,552,747.

In the use of automatic centrifugal clutches of the type now available on the market and wherein the engaging speed is controlled by springs so that the clutch is automatically disengaged when the engine or motor speed is reduced below a certain point, I have found that when the clutch is being used to drive a pulley at a substantially increased rate of speed, the driven load tends to accentuate creepage of the clutch drum and thereby to interfere with the desired idling.

For illustration, if the clutch and pulley structure is being used to drive by means of belts a fan blower at a greater rate of speed than that of the clutch drum, the creepage that occurs will be accentuated by the fly away action of the blower impeller thereby interfering with the idling phase which is desired in the operation and use of the blower.

I have solved the foregoing difficulty by substantially re-arranging the elements of the conventional centrifugal clutch and pulley structure so that the drum thereof is approximately balanced directly over a multi- anti-frictional element type of bearing which carries the drum on a central clutch driving shaft and serves to minimize the likelihood of the drum creeping when the centrifugal clutch assembly for driving the drum is disengaged from the drum.

I also aim, in accordance with this solution of the problem that contronted me, to provide a simpler combination centrifugal clutch and pulley structure wherein the interior surface of the pulley itself actually serves as a part of the clutch in that this surface is disposed around and engageable by the automatically operable centrifugal clutch shoes.

Accordingly, it is objects of the invention to provide a greatly simplified form of combination centrifugal clutch and pulley structure and also to minimize, by reason of the structure thereof, the likelihood of creepage occurring therein when the clutch is disengaged.

Yet, another object of the invention is to so construct the combination clutch and pulley structure that an additional take-off pulley of substantially smaller diameter than the main pulley of the clutch structure is provided on an extension of the main pulley beyond the confines of the interior of the main pulley and whereby both pulleys are operated by the same centrifugal clutch assembly.

In accordance with the general features of this invention, there is provided in a combination centrifugal clutch and pulley drive structure constructed to be carried on a drive shaft, a cylindrical pulley drum to be driven by the shaft and having its exterior surface grooved into a series of spaced belt receiving grooves concentric with the axis of the drum, a supporting body structure on the interior of the drum projecting radially inwardly generally midway of the width of the drum, an anti-frictional bearing substantially centrally of the interior of the drum on which the body structure is carried for rotatably supporting the drum on the drive shaft with the drum approximately balanced over the bearing and a clutch shoe assembly positioned within the drum generally radially along one side of the drum supporting body structure and having a central axially extending sleeve to be carried and driven by the drive shaft, the assembly including spaced spring urged centrifugal clutch shoes extending from the sleeve to a radially outer position for driving engagement with the interior surface of the drum, the anti-frictional bearing freely supporting the drum on the clutch sleeve and aiding to prevent creepage of the drum until driven engagement of the clutch shoes with the drum is centrifugally effected.

Another feature of my novel clutch and pulley structure relates to a central hub-like extension on the drum of my structure which is provided, beyond the confines of the drum, with a smaller pulley than that afforded by the grooved surface of the drum but which is controlled and driven through the same clutch used to actuate the pulley drum.

Other objects and features of this invention will more fully appear from the following detailed description taken in connection with the accompanying drawings which illustrate a single embodiment thereof and in which:

Figure 1 is a somewhat schematic fragmentary plan view of a clutch operated driving system making use of my novel combination centrifugal clutch and pulley structure;

Figure 2 is an enlarged vertical sectional view taken on the line II—II of Figure 1 looking in the direction indicated by the arrows and showing an end elevation of the centrifugal clutch assembly; and Figure 3 is an enlarged fragmentary vertical cross-sectional view taken on substantially the line III—III of Figure 1 showing the manner in which the clutch drum and pulley are centrally supported and its relationship to the clutch assembly at one side and the smaller pulley drive at the other side, and with the belts omitted.

As shown on the drawings:

My novel clutch assembly, which is designated generally by the reference character 10, is especially adapted for use in conjunction with a multiple of drives from a common drive shaft 9 (Figure 1). Actually, my novel clutch assembly 10, as shall become more evident hereinafter, not only embodies clutch means but also comprises grooved pulleys for cooperation with drives 12 and 15. While the driving elements are shown as being V-belt drives, chain and cog drives could likewise be used. Any suitable power means or prime mover 11 may be employed for effecting a drive of the shaft 9.

The belt means 12 comprises a series of parallel V-belts engaged in a driven pulley 13 for driving an apparatus 14 which, for illustration, may comprise a blower such as that used in spraying insecticide and the like. However, the pulley 13 may be used to drive any other apparatus without departing from the spirit and intention of this invention. The belt 15 is likewise a V-belt and drives a pulley 16 connected to a mechanism 17 to be operated which, for illustration, may comprise a liquid pump or the like.

It is clear from Figure 1 that, in the case of the pulley 13, it being a smaller pulley that that of the clutch assembly 10, it is driven at a higher or faster rate of speed. The reverse is true in the case of the pulley 16 which is a larger pulley than the one driving it and, hence, it is driven at a slower rate of speed. The significance of these two different drives will become more apparent with the progress of the description of the pulley and clutch assembly 10.

Referring now to Figure 3, wherein I have illustrated in cross section the structure of my novel pulley and clutch assembly 10, it will be perceived that it embodies a pulley drum 20 having its outer periphery provided with a plurality of spaced V-shaped grooves 21 for accommodating the V-belts of the belt driving means 12.

Positioned interiorly of the hollow drum 20 is a central supporting or web structure 22 extending generally radially substantially midway of the width of the drum. This supporting structure or web 22 terminates in an axially extending tubular hub 23 centrally of and concentric with the periphery of the drum 20. It will also be noted that this hub portion 23 extends axially outwardly beyond the confines of the drum proper for a purpose to be described hereinafter.

The central drum portion 23 is recessed at 24 to accommodate an anti-frictional bearing element 25 which may be of any suitable or conventional type embodying a plurality of anti-frictional elements such as ball bearings.

The bearing 25 is substantially centrally of the interior of the drum and through the supporting web 22 rotatably supports the drum in such a manner that the drum is approximately balanced over the bearing.

Now it will also be noted from Figure 3 that the bearing 25 is, in turn, carried by a tubular sleeve 26 which is journalled on the drive shaft 9 of the prime mover 11. This sleeve 26 is part of the clutch assembly and terminates at one end in an enlarged clutch hub portion 27 located to one side of the supporting web 22 and the bearing 25. In the embodiment illustrated, the clutch assembly, including the hub portion 27, is located inside of the drum 20 between the prime mover 11 and the bearing 25.

Referring now to both Figures 2 and 3, it will be perceived that the hub portion 27 of the sleeve 26 has projecting from it a plurality of spaced clutched shoe supporting arms 28, each of which has a reinforcing flange or web 29. At this time, it should also be noted that the specific construction of this centrifugal clutch assembly is not per se part of this invention but, actually, it is similar to the clutch assembly shown in issued United States Letters Patent No. 2,552,747.

The arms 28 which carry the clutch shoes 30 are disposed generally tangentially to the drive shaft 9. In addition, each of the arms is channeled so as to slidably receive and support an arm 31 formed integrally with the adjoining clutch shoe 30. This arm 31 is connected to the adjoining web 29 of the adjoining arm 28 by a spring 32. In this manner, the three clutch shoes 30 are normally drawn radially inwardly away from the interior surface 34 of the drum 20 adapted to be engaged by the clutch shoes when they are in clutching or driving position.

Of course, as is clear from the aforesaid patent, the springs 32 are so tensioned that they will normally hold the shoes 30 in disengaged or retracted position and until such time as the speed of the drive shaft 20 has reached a predetermined R. P. M. In one application I have made of this invention, I contemplate that the centrifugal clutch shall not become effective to affect a drive between the shaft 9 and the drum 10 until the drive shaft 27 is rotated at a speed in excess of 900 R. P. M. In other words, in the particular application I have made of my novel clutch pulley and assembly, it is not desired that the centrifugal clutch be movable into clutching position until the speed of the drive shaft is accelerated beyond 900 R. P. M. This means that, until that speed is reached, the blower 14 and the pump 17 will not be driven.

According to the foregoing, therefore, the prime mover 11 may be started up without effecting a drive of the mechanisms 14 and 17 and until such time as the speed of the shaft 9 driven by the prime mover 11 has been accelerated to a point in excess of the predetermined minimum.

Referring again to Figure 3, it will be noted that the axial tubular portion 23 of the drum is provided with a V-shaped belt groove 35 beyond the confines of the pulley 20. In this manner, the outer end of the tubular portion 23 serves as a pulley for driving the single belt 15 shown in Figure 1.

I also find it desirable to bearing the tubular portion 23 at the locale of the pulley groove 35 on the central sleeve 26 by a simple type of bearing 36 suitably held in place in a conventional manner by a lock ring 37. The bearing 36 is a press fit in the tubular portion 23. Also the lock ring 37 serves a shoulder to retain the clutch drum on the sleeve 26.

The drive shaft 9 is splined by a key 41 to the clutch sleeve 26 so that the clutch sleeve and the clutch assembly will at all times be driven by the drive shaft 9 upon starting of the prime mover 11. In addition, a set screw 42 may be provided in the clutch hub portion 27 for positively locking the clutch hub to the shaft 9 through the key 41.

Now, I have found from actual practice that unless a bearing of the multiple anti-frictional element or ball type, such as the bearing 25, is disposed between the pulley 20 and the central driving means, namely, the shaft 9 and the clutch sleeve 26, the pulley drum 20 will creep upon the starting of the prime mover 11 so that it is not feasible to maintain the pulley drum in an idling position until the desired speed is reached. It will, of course, be appreciated that the slightest movement of the drum 20 would produce a relatively large movement on the blower pulley 16 which, in turn, would cause the impeller of the blower to act as a fly wheel and encourage the clutch drum 20 to continue to creep.

I have surmounted the difficulties which I experienced by disposing the belt grooves 21 of the drum 20 in an approximately balanced position directly over the ball bearing 25. The word "approximately" is used here because alignment location and casting practices do not always permit dimensional balance. The other or secondary drive for the pump 17, which requires a small pulley on the end of the drum tubular portion 23, made it impractical to use known commercial type roller or ball bearings because of the lack of room. Hence, I used an ordinary conventional solid type bearing such as the bearing 36. Then, too, because of the opposing load of the four belts in the grooves 21 of the drum 20, I have found that very little load was applied to the small bearing 26 which in this case functions as a guide.

By using the foregoing construction and especially the simple ball bearing unit 25 centrally disposed in the drum 20, very little thrust load is imposed. Moreover, it must be remembered that the free wheeling times that the drum operates, or, in other words, when it is inoperative, is relatively small as compared to the time that the drum is operated through the clutch by the shaft 9. In addition, the foregoing arrangement, from a manufacturing standpoint, allows the drum to be made in one piece and also is relatively simple in that only one ball bearing unit 25 is required, thus eliminating the need for special spacers and bearing clamp devices.

When the predetermined speed of the shaft 9 is reached, the springs 32 of the centrifugal clutch are overcome so that the shoes 30 can then fly into driving engagement with the interior surface 34 of the pulley drum 20. Prior to this time creepage of the drum is positively prevented by the advantageous arrangement and structure described hereinabove.

I claim as my invention:

1. In a composite centrifugal clutch and pulley drive structure capable of being slidably mounted on a drive shaft or the like as a self contained unit, a continuous axial sleeve lying in the same plane as the shaft and being substantially coextensive with the length of the unit to support same on the shaft; spring-urged centrifugal clutch means connected to and projecting in a generally radial direction from one end of said sleeve; a housing to contain said clutch means including an outer annular axial portion having an interior surface to be clutched, a radial annular portion connected at one end to said outer annular portion, and an inner annular axial portion connected at one end to said intermediate radial portion, said housing having pulley means thereon which will be driven when contact is made between said clutch means and the surface to be clutched; and an antifrictional bearing supporting said housing on said sleeve and serving to prevent creepage of the housing until driven engagement of the clutch means and the housing is effected.

2. In a composite centrifugal clutch and pulley drive structure capable of being slidably mounted on a drive shaft or the like as a self contained unit, a continuous axial sleeve lying in the same plane as the shaft and being substantially coextensive with the length of the unit to support same on the shaft; spring-urged centrifugal clutch means connected to and projecting in a generally radial direction from one end of said sleeve; a housing to contain said clutch means including an outer annular axial portion having an interior surface to be clutched, a radial annular portion connected at one end to said outer annular portion, and an inner annular axial portion connected at one end to said intermediate radial portion, said housing having pulley means thereon which will be driven when contact is made between said clutch means and the surface to be clutched; and an anti-frictional bearing supporting said housing on said sleeve and serving to prevent creepage of the housing until driven engagement of the clutch means and the housing is effected, said spring-urged centrifugal clutch means including at least one brake shoe, an arm slidably carrying said shoe and being formed integral at one end with said sleeve.

3. In a composite centrifugal clutch and pulley drive structure capable of being slidably mounted on a drive shaft or the like as a self contained unit, a continuous axial sleeve lying in the same plane as the shaft and being substantially coextensive with the length of the unit to support same on the shaft; spring-urged centrifugal clutch means connected to and projecting in a generally radial direction from one end of said sleeve; a housing to contain said clutch means including an outer annular axial portion having an interior surface to be clutched, a radial annular portion connected at one end to said outer annular portion, and an inner annular axial portion connected at one end to said intermediate radial portion, and having pulley means thereon which will be driven when contact is made between said clutch means and the surface to be clutched; and an anti-frictional bearing supporting said housing on said sleeve and serving to prevent creepage of the housing until driven engagement of the clutch means and the housing is effected, said outer annular axial portion having its exterior surface formed for driving cooperation with a series of endless drive elements.

4. In a composite centrifugal clutch and pulley drive structure capable of being slidably mounted on a drive shaft or the like as a self contained unit, a continuous axial sleeve lying in the same plane as the shaft and being substantially coextensive with the length of the unit to support same on the shaft; spring-urged centrifugal clutch means connected to and projecting in a generally radial direction from one end of said sleeve; a housing to contain said clutch means including an outer annular axial portion having an interior surface to be clutched, a radial annular portion connected at one end to said outer annular portion, and an inner annular axial portion connected at one end to said intermediate radial portion, said housing having pulley means thereon which will be driven when contact is made between said clutch means and the surface to be clutched; and an anti-frictional bearing supporting said housing on said sleeve and seving to prevent creepage of the housing until driven engagement of the clutch means and the housing is effected, said continuous axial sleeve having the sole means to effect a firm connection between the self contained unit and the drive shaft.

5. In a composite centrifugal clutch and pulley drive structure capable of being slidably mounted on a drive shaft or the like as a self contained unit, a continuous axial sleeve lying in the same plane as the shaft and being substantially coextensive with the length of the unit to support same on the shaft; spring-urged centrifugal clutch means connected to and projecting in a generally radial direction from one end of said sleeve; a housing to contain said clutch means including an outer annular axial portion having an interior surface to be clutched, a radial annular portion connected at one end to said outer annular portion, and an inner annular axial portion connected at one end to said intermediate radial portion, said housing having pulley means thereon which will be driven when contact is made between said clutch means and the surface to be clutched; and an anti-frictional bearing centrally supporting and approximately balancing said housing over said continuous axial sleeve and additionally aiding to prevent creepage of the housing until driven engagement of the clutch means with the housing is effected.

6. In a composite centrifugal clutch and pulley drive structure capable of being slidably mounted on a drive shaft or the like as a self contained unit, a continuous axial sleeve lying in the same plane as the shaft and being substantially coextensive with the length of the unit to support same on the shaft; spring-urged centrifugal clutch means connected to and projecting in a generally radial direction from one end of said sleeve; a housing to contain said clutch means including an outer annular axial portion having an interior surface to be clutched, a radial annular portion connected at one end to said outer annular portion, and an inner annular axial portion connected at one end to said intermediate radial portion, said housing having pulley means thereon which will be driven when contact is made between said clutch means and the surface to be clutched; an anti-frictional bearing centrally supporting and approximately balancing said housing over said continuous axial sleeve and additionally aiding to prevent creepage of the housing until driven engagement of the clutch means with the housing is effected, and a second bearing between said sleeve and said inner annular portion of said housing serving as a guide to aid in the overall balance of the unit.

References Cited in the file of this patent

UNITED STATES PATENTS

| | | |
|---|---|---|
| 857,970 | Wust-Kunz | June 25, 1907 |
| 2,539,584 | Maier | Jan. 30, 1951 |
| 2,552,747 | Strimple et al. | May 15, 1951 |

FOREIGN PATENTS

| | | |
|---|---|---|
| 17,293 | Great Britain | July 25, 1912 |
| 322,913 | Germany | July 12, 1920 |